Jan. 1, 1952  W. L. KEEN  2,581,260
FISHING FLOAT
Filed Sept. 19, 1949

William Lee Keen,
Inventor.
Koenig and Pope,
Attorneys.

Patented Jan. 1, 1952

2,581,260

UNITED STATES PATENT OFFICE 2,581,260

FISHING FLOAT

William Lee Keen, St. Louis, Mo.

Application September 19, 1949, Serial No. 116,531

7 Claims. (Cl. 43—44.87)

1

This invention relates to fishing floats, and more particularly to improvements in means on such a float for attaching it to a fishing line.

Among the several objects of the invention may be noted the provision of a fishing float having improved means whereby the float may be readily attached to a fishing line, and readily detached from the line; the provision of a float having line attaching means allowing either for clamping of the float on a line for still fishing, or for loose sliding of the float on a line for casting; the provision of a float having line attaching means such as described allowing for ready adjustment of the float on the line in the case where the float is clamped on the line; the provision of a float having line-attaching means which is readily visible on one side of the float when attaching it to a line, or adjusting it on a line, or detaching it from a line, and which is out of view when the float is in the water so as not to detract from the visibility of the float; and the provision of a float such as described which may be economically manufactured. Other objects will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawing, in which one of various possible embodiments of the invention is illustrated, Fig. 1 is a view in elevation of a fishing float embodying the invention;

Similar reference characters indicate corresponding parts throughout the several views of the drawing.

Figure 1:
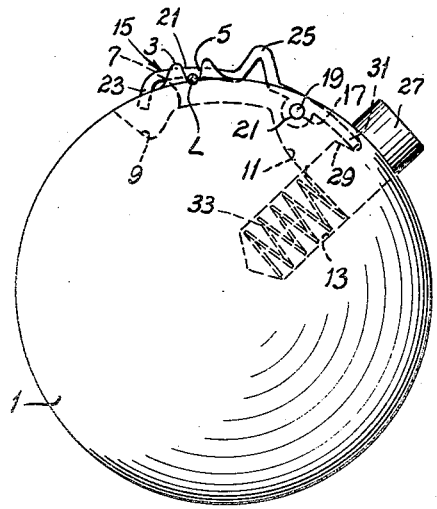

Referring to the drawing, a fishing float of this invention is shown to comprise a generally spherical buoyant float body 1. This has a small protuberance or boss 3 traversed by a shallow groove 5 for receiving a fishing line L. The float body also has a second groove 7 in its surface transverse to the line-receiving groove 5. The boss 3 is located near one end of the groove 7 (its left end as viewed in the drawing), and is bisected by the groove 7. At this left end of the groove 7, there is a shallow depression 9. Groove 7 becomes deeper toward its other end (its right

2 end as viewed in the drawing), as indicated at 11, and opens at this end into a radial cylindrical recess 13.

At 15 is shown a fishing line clamp comprising a lever pivotally mounted intermediate its end in the second groove 7, and extending lengthwise in this groove. The lever is formed intermediate its ends with a pivot pin receiving opening 17. This receives a pin 19 driven in an opening 21 extending through the float body at right angles to and intersecting the groove 7. The pin serves as a pivot for the lever and holds it assembled with the float body. As shown, the pin 19 traverses the groove 7 adjacent the recess 13.

Figure 2:
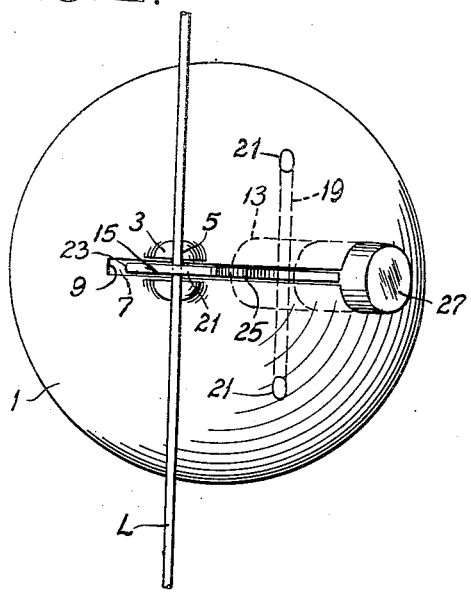
Fig. 2 is a plan of Fig. 1.

The lever 15 has a portion 21 towards its left end as viewed in the drawing adapted to clamp a fishing line L extending transverse to and under the lever against the surface of the float body at the bottom of the line receiving groove 5 in the boss 3 (see Figs. 1 and 2). This portion of the lever terminates in an inturned end 23 receivable in the shallow end depression 9 of the groove 7. Between its point of pivoting and the line clamping portion 21, the lever has an outwardly projecting bend 25. A push button 27 is slidable in the radial recess 13. The button is provided with a wedge-shaped notch 29 which faces toward the groove 7. The right end 31 of the lever extends into the notch, in engagement with the button. A compression spring 33 reacts from the bottom of the recess 13 against the inner end of the button to bias the button outward.

Figure 3:
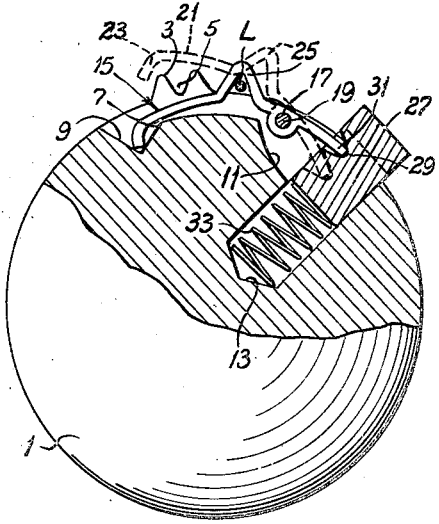
Fig. 3 is a view similar to Fig. 1 partly in section and illustrating parts in a different position from Fig. 1.

When there is no fishing line in the groove 5, the spring 33 biases the button to the fully projecting position illustrated in solid lines in Fig. 3. This position of full projection from the body 1 is determined by the engagement of the end 23 of the lever with the bottom of the depression 9. In this position of the lever, the bend 25 projects from the groove 7 in such manner as to form an eye projecting outward from the float body which is adapted loosely to receive a fishing line L in such manner that the float may slide freely on the line, as illustrated in solid lines in Fig. 3.

By pushing in on the button 27, the lever may be raised to the position shown in dotted lines in Fig. 3. Then a fishing line may be inserted laterally under the outer end of the lever ( its left end as viewed in the drawing) into position within the line-receiving groove 5. Upon releasing the button 27, the lever is biased by the spring 33 into clamping engagement with the fishing line as illustrated in Fig. 1. To adjust the float to different positions on the line, it is only necessary to push in the button to release the clamping engagement of the lever upon the line, whereupon the float may be readily moved to any desired position upon the line.

When the float is in the water, it floats with the lever down, partly because of the weight of the lever and the associated parts, and partly because of the pulling effect of any sinker or weight on the end of the fishing line. Accordingly, when the float is in the water, the lever and associated parts are out of view so as not to detract from the visibility of the float.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A fishing float comprising a buoyant float body having a groove in its surface, a fishing line clamp comprising a lever pivotally mounted intermediate its ends in the groove and extending lengthwise in the groove, a portion of the lever toward one end thereof being adapted to clamp a fishing line extending transverse to and under the lever against the surface of the float body, the float body having a recess under the other end of the lever, and a compression spring in the recess under the lever reacting from the bottom of the recess to bias the lever for clamping the fishing line.

2. A fishing float as defined in claim 1, further characterized in that the lever is formed to provide an eye projecting outward from the float body adapted loosely to receive a fishing line in such manner that the float may slide freely on the line.

3. A fishing float comprising a buoyant float body having a groove in its surface, a fishing line clamp comprising a lever pivotally mounted intermediate its ends in the groove and extending lengthwise in the groove, a portion of the lever toward one end thereof being adapted to clamp a fishing line extending transverse to and under the lever against the surface of the float body, the float body having a recess on the other side of the pivot of the lever into which extends the other end of the lever, a push button slidable in said recess, the said other end of the lever being in engagement with the button, and a compression spring in said recess reacting from the bottom of said recess against the button to bias the lever to clamping position and the button to a position projecting from the body.

4. A fishing float comprising a buoyant float body having a shallow groove in its surface for receiving a fishing line, said body also having a second groove extending transverse to said line-receiving groove, a fishing line clamp comprising a lever pivotally mounted intermediate its ends in the second groove and extending lengthwise therein, a portion of the lever toward one end thereof being adapted to clamp a fishing line against the bottom of said line-receiving groove, the body having a recess on the other side of the pivot of the lever into which extends the other end of the lever, a push button slidable in said recess, the other end of the lever being in engagement with the button, and a compression spring in said recess reacting from the bottom of said recess against said button to bias the lever to clamping position and the button to a position projecting from the body, said one end of the lever being engageable with the float body at the corresponding end of said second groove to limit movement of the lever under the bias of the spring.

5. A fishing float as set forth in claim 4 wherein the lever, on the side of its pivot toward its line-clamping end, has a bend which projects out of the said second groove to form an eye adapted loosely to receive a fishing line in such manner that the float may slide freely on the line.

6. A fishing float comprising a generally spherical buoyant float body having a boss traversed by a shallow groove for receiving a fishing line, said body also having a second groove extending transverse to said line-receiving groove, a fishing line clamp comprising a lever pivotally mounted intermediate its ends in the second groove and extending lengthwise therein, a portion of the lever toward one end thereof being adapted to clamp a fishing line against the bottom of said line-receiving groove, the body having a generally radial recess on the other side of the pivot of the lever, a push button slidable in said radial recess, the other end of the lever being in engagement with the button, and a compression spring in said radial recess reacting from the bottom of said radial recess against said button to bias the lever to a clamping position and the button to a position projecting from the body, said one end of the lever being engageable with the float body at the corresponding end of said second groove to limit movement of the lever under the bias of said spring.

7. A fishing float as set forth in claim 6 wherein the lever, on the side of its pivot toward its line-clamping end, has a bend which projects out of the said second groove to form an eye adapted loosely to receive a fishing line in such manner that the float may slide freely on the line.

WILLIAM LEE KEEN.

REFERENCES CITED

The following references are of record in the file of this patent:

UNITED STATES PATENTS

| Number | Name | Date |
| --- | --- | --- |
| 942,597 | Teasdale | Dec. 7, 1909 |
| 1,362,781 | Chase | Dec. 21, 1920 |
| 2,231,270 | Huston | Feb. 11, 1941 |
| 2,255,853 | Makus et al. | Sept. 16, 1941 |
| 2,481,346 | Rigby | Sept. 6, 1949 |